United States Patent
Chen et al.

(10) Patent No.: US 12,265,601 B1
(45) Date of Patent: Apr. 1, 2025

(54) SECURE AND TRUSTED THREE-PARTY DEVICE FINGERPRINT AUTHENTICATION METHOD

(71) Applicant: Zhejiang University, Hangzhou (CN)

(72) Inventors: Yanjiao Chen, Hangzhou (CN); Yinan Zhong, Hangzhou (CN); Wenyuan Xu, Hangzhou (CN); Qianhao Miao, Hangzhou (CN); Nige Li, Hangzhou (CN); Jiahan Dong, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 18/777,578

(22) Filed: Jul. 19, 2024

(30) Foreign Application Priority Data

Sep. 28, 2023 (CN) .......................... 202311278324.7

(51) Int. Cl.
*G06F 21/00* (2013.01)
*G06F 21/32* (2013.01)
*G06F 21/57* (2013.01)

(52) U.S. Cl.
CPC .............. *G06F 21/32* (2013.01); *G06F 21/57* (2013.01)

(58) Field of Classification Search
CPC ................................. G06F 21/32; G06F 21/57
See application file for complete search history.

(56) References Cited

U.S. PATENT DOCUMENTS

| 2015/0312041 A1* | 10/2015 | Choi ................... H04L 63/0861 713/175 |
| 2017/0169640 A1* | 6/2017 | Britt ........................ G06F 21/35 |
| 2022/0312208 A1* | 9/2022 | An ......................... H04W 12/06 |

FOREIGN PATENT DOCUMENTS

| CN | 112438034 A | 3/2021 |
| CN | 114117522 A | 3/2022 |
| CN | 115801270 A | 3/2023 |

\* cited by examiner

*Primary Examiner* — William A Corum, Jr.
(74) *Attorney, Agent, or Firm* — Bayramoglu Law Offices LLC

(57) ABSTRACT

A secure and trusted three-party device fingerprint authentication method is disclosed. The method includes the following steps: S1. authentication preparation stage: dividing subjects involved in fingerprint authentication into a device party U, a service party P and a storage party V, uploading and verifying an execution program of a trusted execution environment TEE; S2. authentication initialization stage: establishing the trusted execution environment TEE by the service party P, and establishing a security channel between the trusted execution environment TEE, the device party U and the storage party V; and S3. device fingerprint authentication stage: uploading a fingerprint and a fingerprint library to the trusted execution environment TEE through the security channel by the device party U and the storage party V, respectively, after completing a device fingerprint authentication, obtaining an authentication result through the security channel.

4 Claims, 2 Drawing Sheets

SECURE AND TRUSTED THREE-PARTY DEVICE FINGERPRINT AUTHENTICATION METHOD

CROSS REFERENCE TO THE RELATED APPLICATIONS

This application is based upon and claims priority to Chinese Patent Application No. 202311278324.7, filed on Sep. 28, 2023, the entire contents of which are incorporated herein by reference.

TECHNICAL FIELD

The present disclosure relates to the technical field of privacy computing and Internet of Things security, in particular to a secure and trusted three-party device fingerprint authentication method.

BACKGROUND

Nowadays, with the development of the Internet of Things, the multi-subjects cyberspace identity system has been greatly developed. In the scene where the subjects of different architectures and different application fields coexist in coordination, device identity authentication technology plays a vital role. In the current research and application, the device fingerprint authentication technology is often used to authenticate the identity of the device. As device fingerprints become more complex and the number of devices becomes huge, it is often necessary to use third-party computing resources to carry out authentication work of the device fingerprints.

However, the current device fingerprint authentication technology uses a traditional encryption method, which cannot protect the device fingerprint and fingerprint library information from being leaked in an untrusted third-party environment; or uses a homomorphic encryption method, which requires a lot of computing time and computational overhead, which greatly reduces the efficiency and real-time performance of authentication.

In view of the above problems, a secure and trusted three-party device fingerprint authentication method is proposed, which can carry out a secure and efficient three-party device fingerprint authentication. Therefore, the secure and trusted three-party device fingerprint authentication method is particularly important.

Therefore, it is an urgent problem for those skilled in the art to propose a safe and trusted three-party device fingerprint authentication method to solve the difficulties existing in the prior art.

SUMMARY

In view of this, the present disclosure provides a secure and trusted three-party device fingerprint authentication method, to solve the technical problems existing in the prior art.

In order to achieve the above objective, the present disclosure adopts the following technical solutions:

a secure and trusted three-party device fingerprint authentication method, including the following steps:

S1. authentication preparation stage: dividing subjects involved in fingerprint authentication into a device party U, a service party P and a storage party V, uploading and verifying an execution program of a trusted execution environment TEE;

S2. authentication initialization stage: establishing the trusted execution environment TEE by the service party P, and establishing a security channel between the trusted execution environment TEE, the device party U and the storage party V; and S3. device fingerprint authentication stage: uploading a fingerprint and a fingerprint library to the trusted execution environment TEE through the security channel by the device party U and the storage party V, respectively, after completing a device fingerprint authentication, obtaining an authentication result through the security channel.

Optionally, in S1, steps include as follows:

S11. determining tripartite subjects: dividing the subjects involved in fingerprint authentication into U, P and V three parties, wherein U is the device party to perform the device fingerprint authentication, P is the service party to provide fingerprint authentication service, and V is the storage party of the device fingerprint library;

S12. generating private keys by the device party U and the storage party V: using an encryption algorithm to generate the private keys $K_U$ and $K_V$ by the device party U and the storage party V, respectively, wherein, $K_U$ is a private key generated by the device party U using the encryption algorithm, and $K_V$ is a private key generated by the storage party V using the encryption algorithm;

S13. uploading the execution program of the trusted execution environment TEE by the storage party V: determining a program $Program_{tee}$ that needs to be executed in the trusted execution environment by the storage party V, and transferring the program to the service party P; and S14. verifying the execution program by the device party U: verifying the execution program $Program_{tee}$ transmitted from the storage party V to the service party P of the trusted execution environment TEE, confirming that the execution program can correctly establish the trusted execution environment TEE and does not disclose a device fingerprint information of the device party U, continuing with the following steps after verification is completed.

Optionally, in S2, steps include as follows:

S21. establishing the trusted execution environment TEE: using $Program_{tee}$ to establish the trusted execution environment TEE in a trusted execution environment TEE device by the service party P, verifying whether the trusted execution environment TEE is correctly established through the device party U and the storage party V using a security authentication service of TEE, and confirming that trusted execution environment TEE has not been maliciously tampered with; and S22. establishing the security channel: establishing the security channel between the trusted execution environment TEE, the device party U and the storage party V.

Optionally, in S22, steps include as follows:

S221. generating a public key: using an asymmetric encryption algorithm in the trusted execution environment TEE to generate the public key PK, then transferring PK to the device party U and the storage party V, respectively;

S222. authenticating a public key: verifying PK generated by the trusted execution environment TEE through the device party U and the storage party V using the security authentication service of TEE, and confirming that PK has not been maliciously tampered with;

S223. uploading private keys by the device party U and the storage party V: using PK to encrypt their respective private keys $K_U$ and $K_V$ by the device party U and the storage party V, to obtain $EN(K_U,PK)$ and $EN(K_V,PK)$, and uploading to the trusted execution environment TEE, respectively, wherein, $EN(\cdot)$ is an encryption algorithm; and S224. decrypting to obtain private keys by the trusted execution environment TEE: using PK to decrypt $EN(K_U,PK)$ and $EN(K_V,PK)$ in the trusted execution environment TEE, respectively, to obtain a private key of the device party U $K_U=DE(EN(K_U,PK),PK)$, and a private key of the storage party V $K_V=DE(EN(K_V,PK),PK)$, wherein, $DE(\cdot)$ is a decryption algorithm.

Optionally, in S3, steps include as follows:

S31. uploading the fingerprint by the device party U: by the device party U, using a private key to encrypt a fingerprint that needs to be authenticated, to obtain $EN(FP,K_U)$, and transferring $EN(FP,K_U)$ to the trusted execution environment TEE;

S32. uploading the fingerprint library by the storage party V: using a private key to encrypt the fingerprint library by the storage party V, to obtain $EN(FPL, K_V)$, and transferring $EN(FPL, K_V)$ to the trusted execution environment TEE, wherein, $EN(\cdot)$ is an encryption algorithm, FPL is a device fingerprint library;

S33. decrypting to obtain a fingerprint and a fingerprint library: using $K_U$ and $K_V$ to decrypt $EN(FP,K_U)$ and $EN(FPL, K_V)$ in the trusted execution environment TEE, respectively, to obtain an authenticated fingerprint $FP=DE(EN(FP,K_U), K_U)$ and an authenticated device fingerprint library $FPL=DE(EN(FPL, K_V), K_V)$;

S34. comparing a device fingerprint authentication: performing the device fingerprint authentication in the trusted execution environment TEE, to obtain a result $R=Veri(FP, FPL)$, wherein, R is a result of device fingerprint authentication, and $Veri(\cdot)$ is an authentication algorithm;

S35. issuing authentication results: encrypting R using private keys $K_V$ and $K_V$ in the trusted execution environment TEE, to obtain $EN(R,K_U)$ and $EN(R,K_V)$, respectively, transferring $EN(R,K_U)$ to the device party U, and transferring $EN(R,K_V)$ to the storage party V; and S36. obtaining authentication results by the device party U and the storage party V: using the private key $K_U$ to encrypt $EN(R,K_U)$ by the device party U, to obtain an authentication result $R=DE(EN(R,K_U), K_U)$, and using the private key $K_V$ to encrypt $EN(R,K_V)$, to obtain an authentication result $R=DE(EN(R,K_V), K_V)$.

It can be known from the above technical solutions that, compared with the prior art, the present disclosure discloses and provides a secure and trusted three-party device fingerprint authentication method, and its beneficial effects are:

1) the existing real-time device fingerprint authentication methods cannot be carried out in an untrusted third party, while the present disclosure has no restrictions on the trustworthiness or untrustworthiness of the service party;

2) in order to protect the privacy of the device party and the storage party, the existing device fingerprint authentication method often uses homomorphic encryption privacy computing technology, which can greatly increase the computational time and computational overhead, under the premise of ensuring security, the present disclosure greatly reduces the computational time and computational overhead, making fingerprint authentication can be carried out in real-time;

3) it has generalization ability, in practical application scenarios, the subjects involved in the authentication may be only the device party and the storage party, which is equivalent to the fact that the service party is the device party or the service party is the storage party; and 4) it can achieve safe and efficient device fingerprint authentication while ensuring that the privacy data of the device party and the storage party cannot be stolen.

BRIEF DESCRIPTION OF THE DRAWINGS

To more clearly illustrate the technical solutions in the embodiments of the present invention or in the prior art, the drawings required to be used in the description of the embodiments or the prior art are briefly introduced below. It is obvious that the drawings in the description below are merely embodiments of the present invention, and those of ordinary skill in the art can obtain other drawings according to the drawings provided without creative efforts.

DETAILED DESCRIPTIONS OF THE EMBODIMENTS

The following clearly and completely describes the technical solutions in the embodiments of the present disclosure with reference to drawings in the embodiments of the present disclosure. It is clear that the described embodiments are merely a part rather than all of the embodiments of the present disclosure. Based on the embodiments of the present disclosure, all other embodiments obtained by those of ordinary skill in the art without creative efforts shall fall within the protection scope of the present disclosure.

Figure 1:
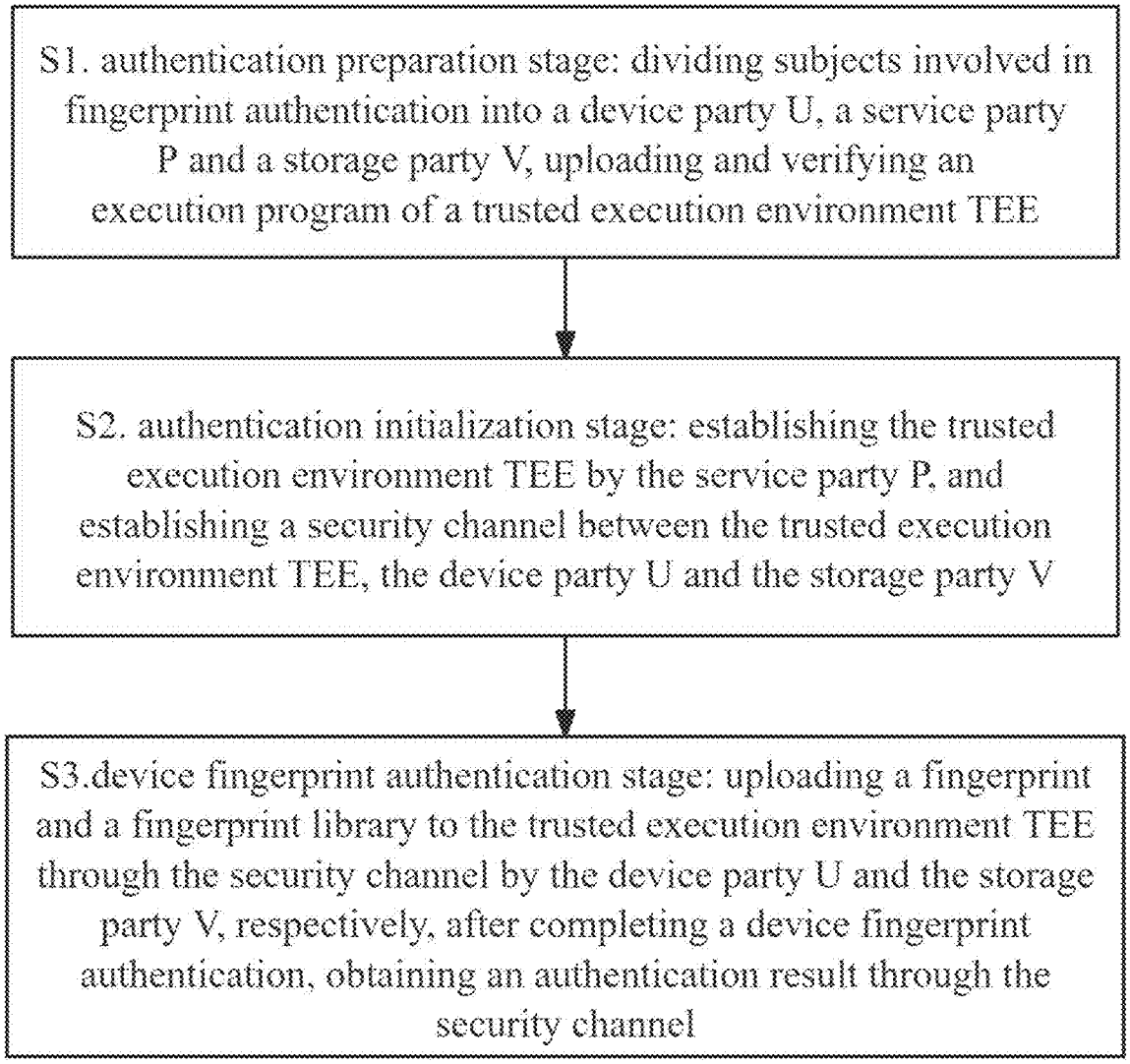
FIG. 1 is a flow chart of a secure and trusted three-party device fingerprint authentication method provided by the present disclosure.

Referring to FIG. 1, the present disclosure discloses a secure and trusted three-party device fingerprint authentication method, including the following steps:

S1. authentication preparation stage: dividing subjects involved in fingerprint authentication into a device party U, a service party P and a storage party V, uploading and verifying an execution program of a trusted execution environment TEE;

S2. authentication initialization stage: establishing the trusted execution environment TEE by the service party P, and establishing a security channel between the trusted execution environment TEE, the device party U and the storage party V; and S3. device fingerprint authentication stage: uploading a fingerprint and a fingerprint library to the trusted execution environment TEE through the security channel by the device party U and the storage party V, respectively, after completing a device fingerprint authentication, obtaining an authentication result through the security channel.

Figure 2:
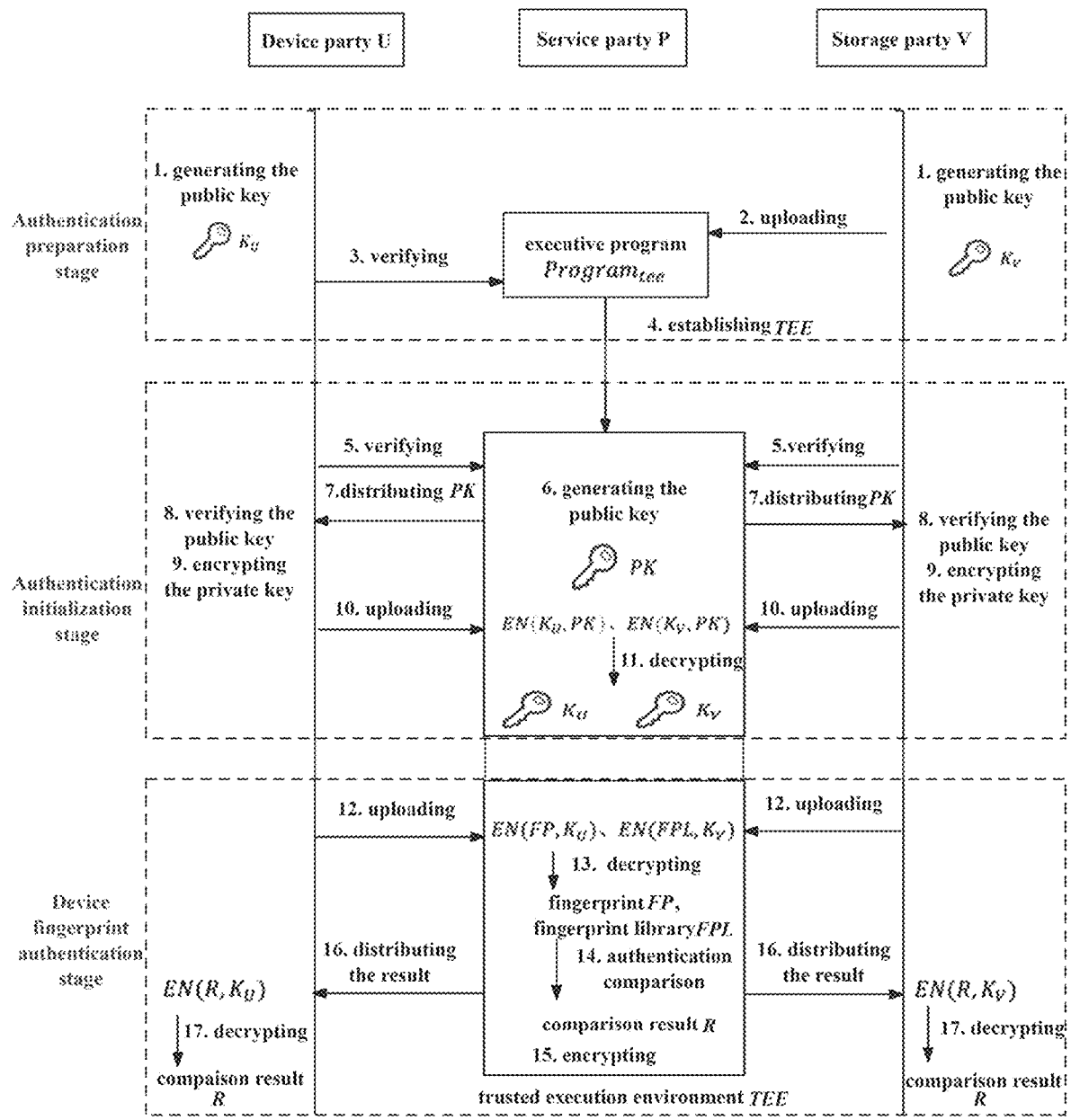
FIG. 2 is a specific flow chart of the secure and trusted three-party device fingerprint authentication method provided by the present disclosure.

Specifically, referring to FIG. 2, it is an overall flow chart of the secure and trusted three-party device fingerprint authentication method.

Further, in S1, steps include as follows:

S11. determining tripartite subjects: dividing the subjects involved in fingerprint authentication into U, P and V three parties, wherein U is the device party to perform the device fingerprint authentication, P is the service party to provide fingerprint authentication service, and V is the storage party of the device fingerprint library;

S12. generating private keys by the device party U and the storage party V: using an encryption algorithm to generate the private keys $K_U$ and $K_V$ by the device party U and the storage party V, respectively, wherein, $K_U$ is a private key generated by the device party U using the encryption algorithm, and $K_V$ is a private key generated by the storage party V using the encryption algorithm;

S13. uploading the execution program of the trusted execution environment TEE by the storage party V: determining a program $Program_{tee}$ that needs to be executed in the trusted execution environment by the storage party V, and transferring the program to the service party P; and S14. verifying the execution program by the device party U: verifying the execution program $Program_{tee}$ transmitted from the storage party V to the service party P of the trusted execution environment TEE, confirming that the execution program can correctly establish the trusted execution environment TEE and does not disclose a device fingerprint information of the device party U, continuing with the following steps after verification is completed.

Specifically, an RSA encryption algorithm can be used to generate the key.

Further, in S2, steps include as follows:

S21. establishing the trusted execution environment TEE: using $Program_{tee}$ to establish the trusted execution environment TEE in a trusted execution environment TEE device by the service party P, verifying whether the trusted execution environment TEE is correctly established through the device party U and the storage party V using a security authentication service of TEE, and confirming that trusted execution environment TEE has not been maliciously tampered with; and S22. establishing the security channel: establishing the security channel between the trusted execution environment TEE, the device party U and the storage party V.

Specifically, Intel's software protection extension device Intel SGX can be used as a trusted execution environment device, and Intel SGX's remote authentication (RA) technology can be used to verify whether TEE is correctly established.

Further, in S22, steps include as follows:

S221. generating a public key: using an asymmetric encryption algorithm in the trusted execution environment TEE to generate the public key PK, then transferring PK to the device party U and the storage party V, respectively;

S222. authenticating a public key: verifying PK generated by the trusted execution environment TEE through the device party U and the storage party V using the security authentication service of TEE, and confirming that PK has not been maliciously tampered with;

S223. uploading private keys by the device party U and the storage party V: using PK to encrypt their respective private keys $K_U$ and $K_V$ by the device party U and the storage party V, to obtain $EN(K_U,PK)$ and $EN(K_V,PK)$, and uploading to the trusted execution environment TEE, respectively, wherein, $EN(\cdot)$ is an encryption algorithm; and S224. decrypting to obtain private keys by the trusted execution environment TEE: using PK to decrypt $EN(K_U,PK)$ and $EN(K_V,PK)$ in the trusted execution environment TEE, respectively, to obtain a private key of the device party U $K_U=DE(EN(K_U,PK),PK)$, and a private key of the storage party V $K_V=DE(EN(K_V,PK), PK)$, wherein, $DE(\cdot)$ is a decryption algorithm.

Specifically, the RSA encryption algorithm can be used to generate public key, Intel SGX remote authentication (RA) technology can be used to verify PK generated by TEE, and the RSA encryption algorithm can be used as $EN(\cdot)$, an RSA decryption algorithm can be used as $DE(\cdot)$.

Further, in S3, steps include as follows:

S31. uploading the fingerprint by the device party U: by the device party U, using a private key to encrypt a fingerprint that needs to be authenticated, to obtain $EN(FP,K_U)$, and transferring $EN(FP,K_U)$ to the trusted execution environment TEE;

S32. uploading the fingerprint library by the storage party V: using a private key to encrypt the fingerprint library by the storage party V, to obtain $EN(FPL, K_V)$, and transferring $EN(FPL, K_V)$ to the trusted execution environment TEE, wherein, $EN(\cdot)$ is an encryption algorithm, FPL is a device fingerprint library;

S33. decrypting to obtain a fingerprint and a fingerprint library: using $K_U$ and $K_V$ to decrypt $EN(FP,K_U)$ and $EN(FPL, K_V)$ in the trusted execution environment TEE, respectively, to obtain an authenticated fingerprint $FP=DE(EN(FP,K_U), K_U)$ and an authenticated device fingerprint library $FPL=DE(EN(FPL, K_V), K_V)$;

S34. comparing a device fingerprint authentication: performing the device fingerprint authentication in the trusted execution environment TEE, to obtain a result $R=Veri(FP,FPL)$, wherein, R is a result of device fingerprint authentication, and $Veri(\cdot)$ is an authentication algorithm;

S35. issuing authentication results: encrypting R using private keys $K_V$ and $K_V$ in the trusted execution environment TEE, to obtain $EN(R,K_U)$ and $EN(R,K_V)$, respectively, transferring $EN(R,K_U)$ to the device party U, and transferring $EN(R,K_V)$ to the storage party V; and S36. obtaining authentication results by the device party U and the storage party V: using the private key $K_U$ to encrypt $EN(R,K_U)$ by the device party U, to obtain an authentication result $R=DE(EN(R,K_U), K_U)$, and using the private key $K_V$ to encrypt $EN(R,K_V)$, to obtain an authentication result $R=DE(EN(R,K_V), K_V)$.

Specifically, the binary search algorithm can be used as $Veri(\cdot)$.

Specifically, with the development of the Internet of Things, the authentication of device fingerprint has become a crucial technology to ensure the security of the Internet of Things, however, the current device fingerprint authentication method has the problems of being unable to be carried out in an untrusted third party, cannot be real-time and low efficiency. The present disclosure proposes a secure and trusted three-party device fingerprint authentication method, which can achieve safe and efficient device fingerprint authentication while ensuring that the privacy data of the device party and the storage party cannot be stolen, under the premise of ensuring security, the calculation time and calculation overhead are greatly reduced, making the fingerprint authentication can be carried out in real-time.

Various embodiments of the present specification are described in a progressive manner, and each embodiment focuses on the description that is different from the other embodiments, and the same or similar parts between the various embodiments are referred to with each other. For the device disclosed by embodiments, because it corresponds to the method disclosed by embodiments, the description is comparatively simple. For related parts, refer to descriptions in the method.

The above description of the disclosed embodiments enables those skilled in the art to implement or use the present invention. Various modifications to these embodiments will be readily apparent to those skilled in the art, and the generic principles defined herein may be applied to other embodiments without departing from the spirit or scope of the present invention. Thus, the present invention is not intended to be limited to these embodiments shown herein but is to be accorded the broadest scope consistent with the principles and novel features disclosed herein.

The invention claimed is:

1. A secure and trusted three-party device fingerprint authentication method, comprising the following steps:
   (S1), performing an authentication preparation stage by dividing subjects involved in fingerprint authentication into a device party U, a service party P and a storage party V, uploading and verifying an execution program of a trusted execution environment TEE Program$_{tee}$;
   (S2), performing an authentication initialization stage by establishing the trusted execution environment TEE by the service party P, and establishing a security channel between the trusted execution environment TEE, the device party U and the storage party V; and
   (S3), performing a device fingerprint authentication stage by uploading a fingerprint FP and a fingerprint library FPL to the trusted execution environment TEE through the security channel by the device party U and the storage party V, respectively, after completing a device fingerprint authentication, obtaining an authentication result through the security channel;
   wherein (S1) comprises the following steps:
   (S11), determining tripartite subjects by dividing the subjects involved in the fingerprint authentication into the U, P and V three parties, wherein U performs the device fingerprint authentication, P provides a fingerprint authentication service, and V stores the device fingerprint library;
   (S12), generating private keys by the device party U and the storage party V by using an encryption algorithm to generate private keys $K_U$ and $K_V$ by the device party U and the storage party V, respectively, wherein, $K_U$ is a private key generated by the device party U using the encryption algorithm, and $K_V$ is a private key generated by the storage party V using the encryption algorithm;
   (S13), uploading the execution program of the trusted execution environment TEE by the storage party V by determining that the execution program Program$_{tee}$ that to be executed in the trusted execution environment by the storage party V, and transferring the execution program to the service party P; and
   (S14), verifying the execution program by the device party U by verifying that the execution program Program$_{tee}$ was transmitted from the storage party V to the service party P of the trusted execution environment TEE, confirming that the execution program correctly established the trusted execution environment TEE and does not disclose the device fingerprint information of the device party U.

2. The secure and trusted three-party device fingerprint authentication method according to claim 1, wherein (S2) comprises the following steps:
   (S21), establishing the trusted execution environment TEE by using Program$_{tee}$ to establish the trusted execution environment TEE in a trusted execution environment TEE device by the service party P, verifying whether the trusted execution environment TEE is correctly established through the device party U and the storage party V using a security authentication service of the TEE, and confirming that trusted execution environment TEE has not been maliciously tampered with; and
   (S22), establishing the security channel by establishing the security channel between the trusted execution environment TEE, the device party U and the storage party V.

3. The secure and trusted three-party device fingerprint authentication method according to claim 2, wherein (S22) comprises the following steps:
   (S221), generating a public key by using an asymmetric encryption algorithm in the trusted execution environment TEE to generate the public key PK, then transferring the PK to the device party U and the storage party V, respectively;
   (S222), authenticating the public key by verifying the PK generated by the trusted execution environment TEE through the device party U and the storage party V using the security authentication service of the TEE, and confirming that PK has not been maliciously tampered with;
   (S223), uploading the private keys by the device party U and the storage party V using the PK to encrypt their respective private keys $K_U$ and $K_V$ by the device party U and the storage party V, to obtain EN($K_U$,PK) and EN($K_V$,PK), and uploading to the trusted execution environment TEE, respectively, wherein, EN(·) is the asymmetric encryption algorithm; and
   (S224), decrypting to obtain the private keys by the trusted execution environment TEE using the PK to decrypt EN($K_U$,PK) and EN($K_V$,PK) in the trusted execution environment TEE, respectively, to obtain the private key of the device party U $K_V$=DE(EN($K_V$,PK), PK), and the private key of the storage party V $K_V$=DE (EN($K_V$,PK),PK), wherein, DE(·) is a decryption algorithm.

4. The secure and trusted three-party device fingerprint authentication method according to claim 2, wherein (S3) comprises the following steps:
   (S31), uploading the fingerprint by the device party U: by the device party U, using a private key to encrypt a fingerprint that needs to be authenticated, to obtain EN(FP,$K_U$), and transferring EN(FP,$K_U$) to the trusted execution environment TEE;
   (S32), uploading the fingerprint library by the storage party V using a private key to encrypt the fingerprint library by the storage party V, to obtain EN(FPL, $K_V$), and transferring EN(FPL, $K_V$) to the trusted execution environment TEE, wherein, EN(·) is a second encryption algorithm, FPL is a device fingerprint library;
   (S33), decrypting to obtain the fingerprint and the fingerprint library by using $K_U$ and $K_V$ to decrypt EN(FP,$K_U$) and EN(FPL, $K_V$) in the trusted execution environment TEE, respectively, to obtain an authenticated fingerprint FP=DE(EN(FP,$K_V$), $K_U$) and an authenticated device fingerprint library FPL=DE(EN(FPL, $K_V$), $K_V$);
   (S34), comparing the device fingerprint authentication by performing the device fingerprint authentication in the trusted execution environment TEE, to obtain a result R=Veri(FP,FPL), wherein, R is the result of the device fingerprint authentication, and Veri(·) is an authentication algorithm;

(S35), issuing authentication results by encrypting the result R using private keys $K_U$ and $K_V$ in the trusted execution environment TEE, to obtain $EN(R,K_U)$ and $EN(R,K_V)$, respectively, transferring $EN(R,K_U)$ to the device party U, and transferring $EN(R,K_V)$ to the storage party V; and (S36), obtaining the authentication results by the device party U and the storage party V using the private key $K_U$ to encrypt $EN(R,K_U)$ by the device party U, to obtain an authentication result $R=DE(EN(R,K_U), K_U)$, and using the private key $K_V$ to encrypt $EN(R,K_V)$, to obtain an authentication result $R=DE(EN(R,K_V), K_V)$.

* * * * *